Patented Apr. 21, 1942

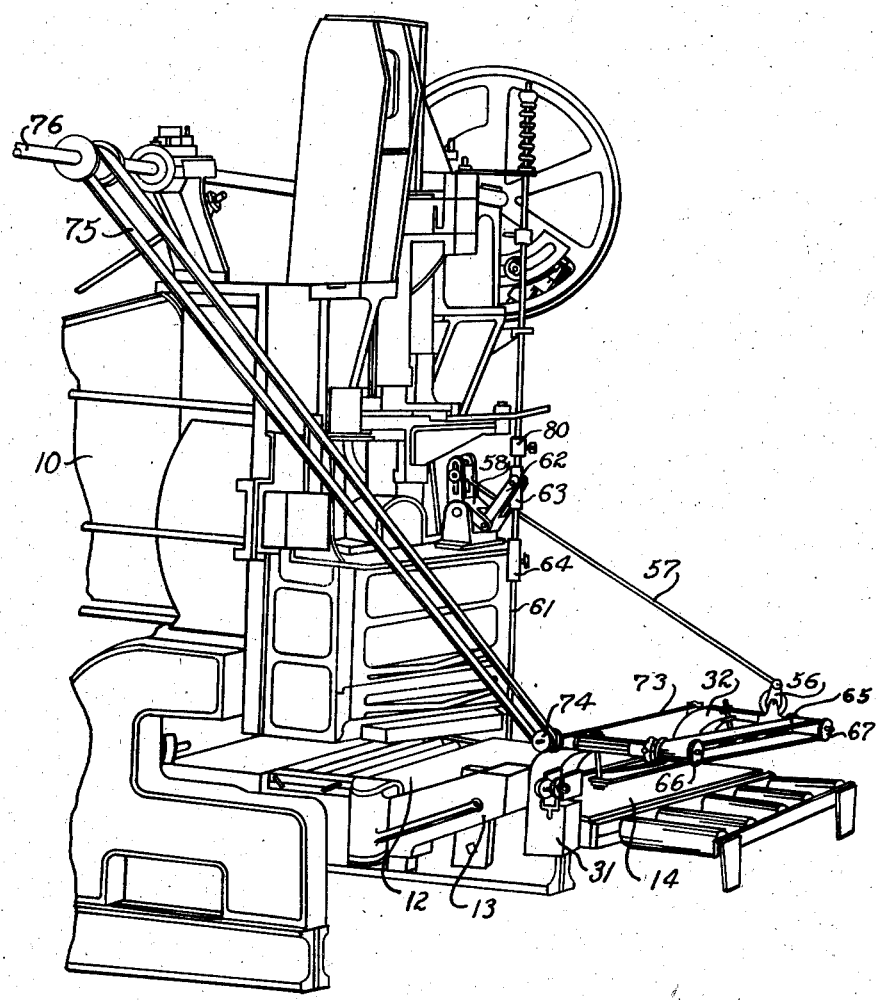

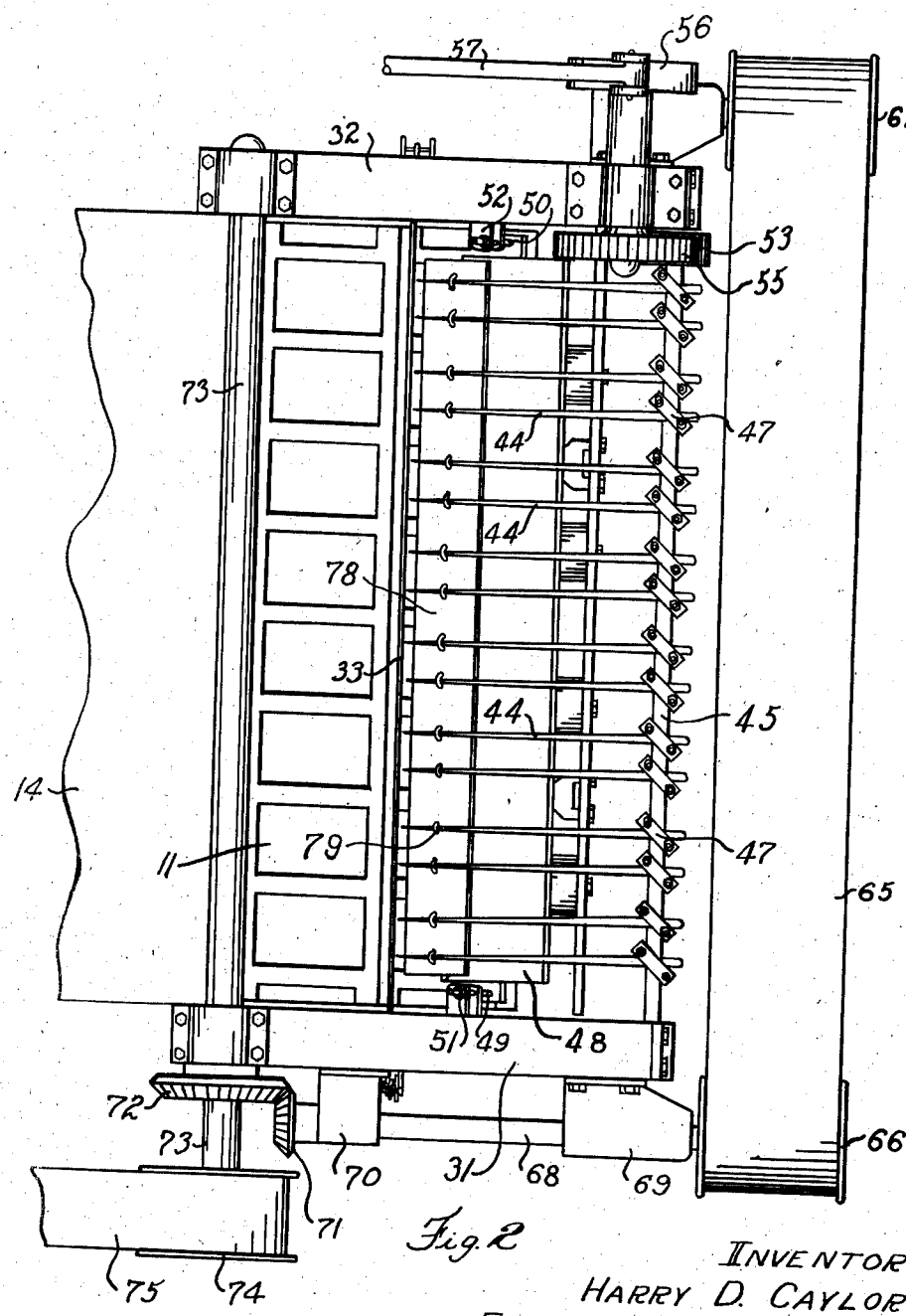

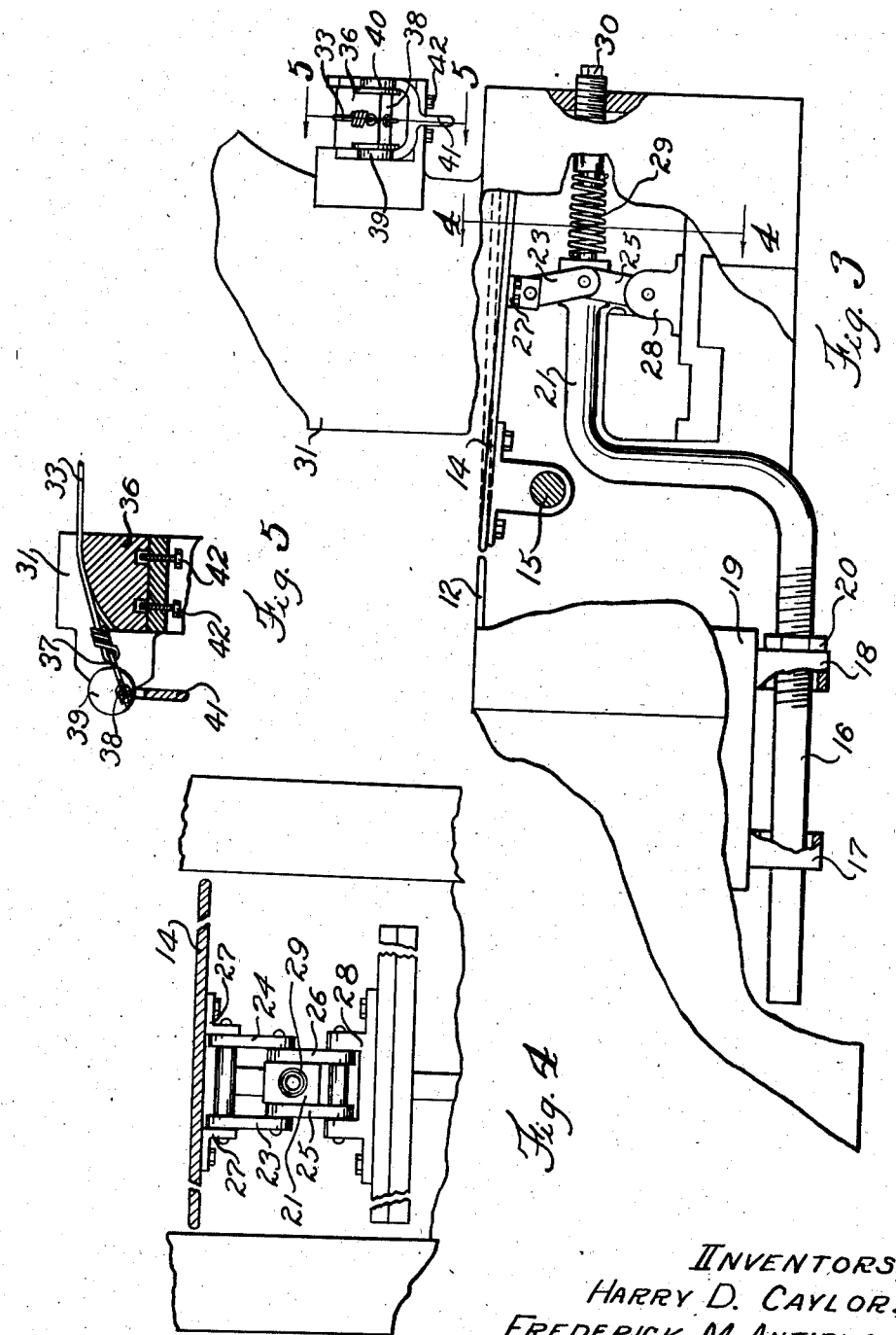

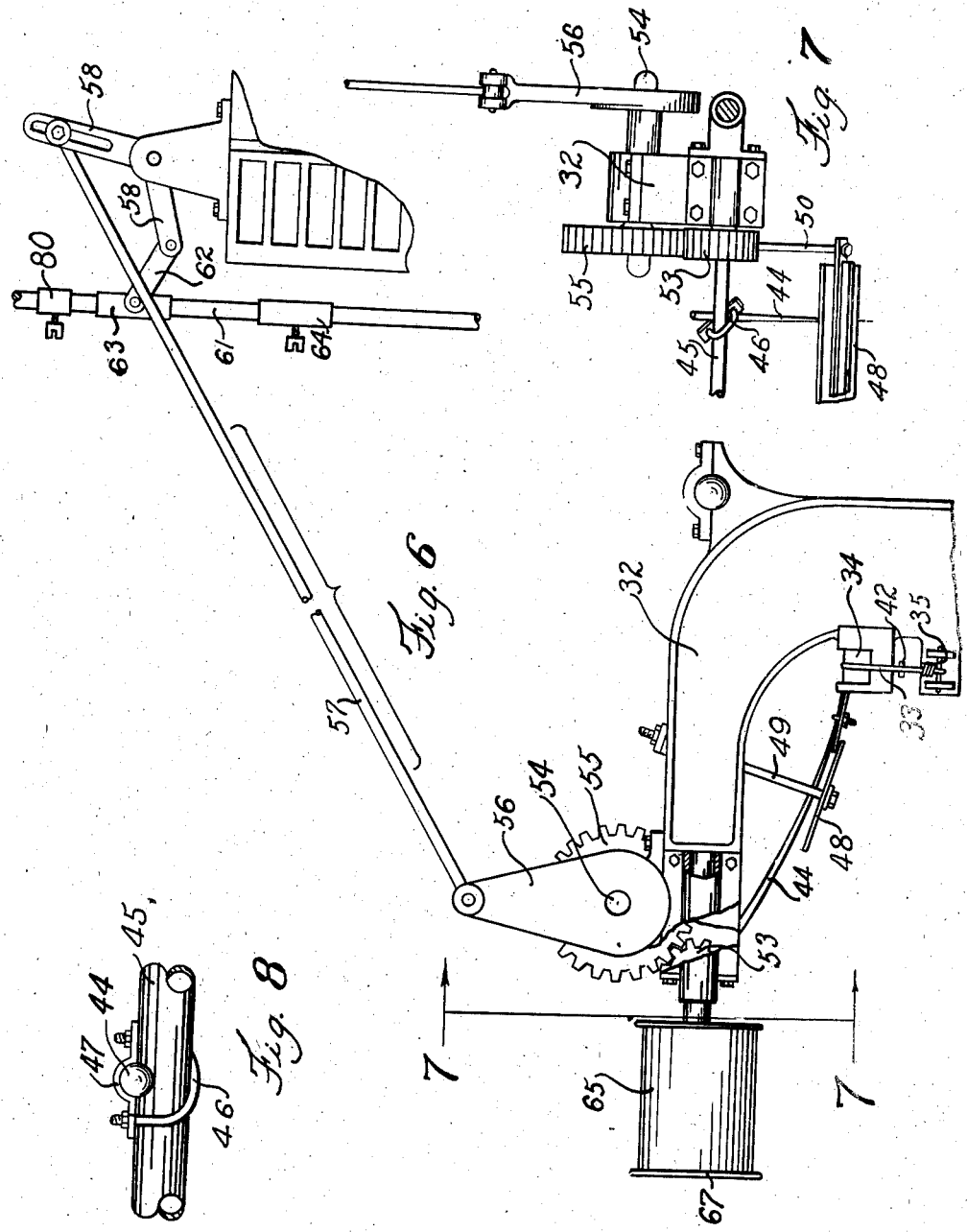

2,280,276

UNITED STATES PATENT OFFICE 2,280,276

BRICK MACHINE MOLD TRIMMER

Frederick M. Antibus, Jr., and Harry D. Caylor, Indianapolis, Ind., assignors to C. & G. Potts & Co., Indianapolis, Ind., a corporation of Indiana Application June 21, 1940, Serial No. 341,644

11 Claims. (Cl. 25—104)

This invention relates to the art of brick making machines and has for a primary object the incorporation with a brick making machine means for removing surplus clay from the molds which has raised above the top edge of the mold following a mold bumping operation. A further important object of the invention is to form a structure for that clay removal in such manner that it may be operated directly from the mechanism of the molding machine itself and which will consist of a minimum number of parts, all working automatically in sequence with the molding operations.

A further important object of the invention is to provide a cutter wire mounted in a stationary manner so that, by travel of the mold thereunder, the surplus clay appearing above the top edges of the molds may be cut off by that wire. A still further important object of the invention is to provide means which will automatically receive that removed clay and carry it away from the molds and deposit it at one side of the machine out of the way of the operator.

These and other objects and advantages of the invention will become apparent to those versed in the art in the following description of one particular form of the invention as illustrated in the accompanying drawings, in which Fig. 1 is a front view in perspective of a brick molding machine to which the invention is applied;

Fig. 2, a top plan view of the mechanism embodying the invention;

Fig. 3, a detail on an enlarged scale in side elevation and partial section of the forward end of the mold supporting table;

Fig. 4, a detail in transverse section on the line 4—4 in Fig. 3;

Fig. 5, a detail in section on the line 5—5 in Fig. 3;

Fig. 6, a detail in left-hand side elevation of the clay removing drive mechanism;

Fig. 7, a detail in section on the line 7—7 in Fig. 6; and

Fig. 8, a detail in front elevation of a clay receiving finger mounting.

Like characters of reference indicate like parts throughout the several views in the drawings.

In the usual molding machine, generally designated by the numeral 10, clay is deposited in the molds 11 and pressed therein. Following that operation, the mold is advanced forwardly on the table 12 to a station wherein the bumper 13, one being on each side as indicated in the U. S. Patent to Potts and Minter, No. 1,815,583, issued July 21, 1931, strikes the mold. In this bumping operation which is performed to loosen the clay from the side walls of the mold, there is no other place for the clay to go but upwardly to extend slightly beyond the top edge of the mold. This, of course, increases the vertical dimension of the brick and it is desirable to remove that excess clay. In the usual manner well known to those versed in the art, the mold is advanced along the table 12 from the station at which it stops for the bumping operation, to a forward portion of the table, herein designated by the numeral 14. This forward end of the table 14 is hinged transversely by any suitable means, such as the hinge pin 15, Fig. 3, and is automatically raised and lowered between some such limits as indicated in Fig. 3 by the solid lines to the dash lines and reverse.

In the form of the invention herein shown, the lowering of the table section 14 is accomplished by means of a bar or rod 16 which is loosely carried through ears 17 and 18 fixed to the slide 19 that is reciprocated in fore and aft directions by any suitable means to operate the bumpers 13, an advantage being taken of the reciprocating slide 19 already appearing on the brick making machine shown and described in the above indicated Patent No. 1,815,583. The slide 19, just referred to, is a part of the old machine to which our present invention is to be applied. This slide 19, as indicated in the aforesaid patent, is reciprocated horizontally in timed sequence with the travel of the brick molds. This slide 19 is provided to actuate the mold bumping mechanism, all as illustrated by that patent. The essential thing in the present invention is that there be some reciprocating member such as the slide 19 present to impart a forward travel to the rod 16 in a certain time relation to the shifting of the molds along the table top 12 and its forward section 14. A nut 20 adjustably carried along the rod 16 is placed in front of the forward ear 18 to serve as an abutment on the rod 16 against which the ear 18 will press and move the rod 16 as the slide 19 moves forwardly.

In order to clear other mechanism found under the table top section 14, the rod 16 is bent around upwardly and thence forwardly into a section 21 which has pivoted thereto upwardly extending links 23 and 24 and downwardly extending links 25 and 26. The upper ends of the links 23, 24 are pivotally connected with suitable brackets 27 fixed to the underside of the table section 14 and the lower ends of the links 25, 26 are pivotally connected with a bracket 28 mounted in a stationary manner. This structure forms in effect a toggle-joint arrangement whereby by pushing forwardly on the rod length 21, the links are rocked from vertical positions to the inclined positions as indicated in Fig. 3, which action will lower the table top section 14 to the solid line position. Then when the slide 19 shifts rearwardly, a spring 29 bearing between the rear end of the adjusting screw 30 and the forward end of the rod length 21 will return the links to their vertical positions and thereby lift the table back up to that position indicated by the dash lines. The compression of the spring 29 may be adjusted by manipulating the screw 30.

On each side of the table section 14 is secured an arm 31 and 32 respectively extending upwardly above the table section 14 and thence forwardly. A wire 33 is stretched between these arms 31 and 32 and spaced above the top section 14 a distance which, when the table section 14 is in its uppermost position, will strike compressively against the top edges of the mold 11. It is the purpose of hinging the table section 14 as above indicated to drop that section at the time the mold 11 is being shoved forwardly from the table top 12 from the bumper station so that the forwardly moving mold will have its front top edge just clear the wire 33. The wire is positioned across the top section 14 so that when the mold comes to a stop the wire will be then resting immediately on the forward top edge of the mold and/or slightly forward of the clay therein. The dropping of the table section 14 prevents the mold from striking the wire 33 by its forward side.

The wire 33 is anchored at one of the arms, herein shown as at the arm 32, by being passed over a block 34 and then curved downwardly to have its end fixed in any suitable manner, such as being secured to the cross pin 35, Fig. 6. The other end of the wire 33 is carried over a like block 36, Figs. 3 and 5, to curve downwardly and outwardly and be engaged with an eyebolt 37 which in turn is secured to a cross pin 38 horizontally positioned between and fixed by its ends with cams 39 and 40, each resting in a hollowed abutment extending from the side of the arm, as indicated in Figs. 3 and 5. The cams 39 and 40 are tied together to be rocked in unison by any suitable means such as the handle 41. Thus by rocking the handle 41 around in a counterclockwise direction, the wire 33 is pulled longitudinally across the block 36 to increase its tension and then by swinging the handle 41 on downwardly to drop the pin 38 below the center line through the cams 39 and 40, that tension is maintained since the upper ends of the handle 41 strike against the abutments carrying the cams. In order to adjust the elevation of the wire 33, both the blocks 34 and 36 may be raised or lowered within limits, the vertical adjusting of the blocks being had by some such means as set screws 42 shown in Figs. 5 and 6, to be carried upwardly against the blocks 34 and 36 to lift them against the normal downward pull of the wire 33.

Forwardly of the wire 33 in the direction in which the molds 11 advance, is positioned means for receiving the clay cut off by the wire 33, this clay traveling forwardly as the molds travel to deliver this separated clay onto the receiving device. In the form herein shown, this device consists of a plurality of relatively closely spaced fingers 44 resembling somewhat the tines of a pitchfork in that the fingers are each tapered from a relatively thick cross section at their rear ends through a gradually reducing cross section to sharp terminal points and at the same time bowing downwardly. The rear ends of these fingers 44 are secured in any suitable manner to a transverse rocker shaft 45, such means herein shown as being by clips 46 engaging around the shaft 45 to carry clamp bars 47 over the finger 44 in each instance, Fig. 8, the shaft 45 preferably being engaged to receive the finger 44 thereacross in each instance. These fingers 44 are thus held in parallel alignment to have their free pointed ends adjacent the wire 33 and at substantially the same elevation as the wire.

Extending transversely across under these fingers 44 is a plate 48 mounted between the arms 31 and 32 to prevent crumbs from the ribbon of clay cut by the wire 33 from dropping downwardly between the fingers 44 as that ribbon or band slides over onto the fingers. This plate 48 is herein shown as being secured to the arms 31 and 32 by bolts 49 and 50 extending upwardly from the plate and through brackets 51 and 52 respectively fixed on the arms 31 and 32.

The amount of clay cut off by the wire 33 will vary from time to time depending upon the condition of the dies in the machine when the clay is placed into the molds. Since the amount of clay sheared off may be quite small at times, a plate 78 is secured across the under sides of the fingers 44 near their rear free ends by any suitable means such as by clips 79. The clips are far enough back from the ends of the fingers 44 to prevent interference with the sliding action of the clay onto these fingers. In any event the plate 78 will prevent the clay from dropping downwardly between the fingers and will insure the carrying of the clay around to the discharging zone as will hereinafter be explained.

This rocker shaft 45 is mounted on the arms 31 and 32 and carries at one end thereof a pinion gear 53, here shown as adjacent the arm 32. A jackshaft 54, also carried by the arm 32, has a pinion gear 55 fixed thereon to be in constant mesh with the gear 53. A lever 56 is secured to the shaft 54 outside of the arm 32, Figs. 6 and 7. A connecting rod 57 has its forward end rockably secured to the outer end of the lever 56 and carried rearwardly and upwardly to be adjustably secured to one end of a bell crank 58 through a link 62 to a sleeve 63 through which the rod 61 is free to slide. This rod 61 is a part of the old brick making machine, normally reciprocated to actuate other mechanism (not shown) to move the molds 11 forwardly on the table 12 in timed sequence for the bumping operations as referred to in the prior Patent No. 1,815,583. Advantage is taken of this timed reciprocating action of the rod 61 to secure the desired timing and driving of the means for receiving the clay cut off by the wire 33. This rod 61 is reciprocated vertically by cam means (not shown) carried by the brick making machine 10. The spring 85 surrounding the top end of the rod 61 normally holds and returns the rod to its uppermost position. In so far as the present invention is concerned, it is immaterial as to the exact means employed in the old machine for reciprocating the rod and it is further immaterial in so far as the invention is concerned to reverse the action of the spring 85 whereby the upward travel of the rod 61 is by the cam means instead of by the spring 85 and the downward travel of the rod 61 is occasioned by the reversed position of the spring. Then by placing an adjustable stop 64 on the rod 61 below the sleeve 63, upward travel of the rod 61 will cause the stop 64 to strike the sleeve 63 and thereby rock the bell crank lever 58 and in turn pull back the rod 57 to rock the shaft 45 through the gears 55 and 53 to throw up the forward ends of the fingers 44 and carry them around sufficiently far to dump the clay resting thereacross onto an endless belt 65 positioned transversely across the machine immediately ahead of the shaft 45.

The rod 61 preferably carries an upper adjustably positioned collar 80 above the sleeve 63 so that, if necessary, the sleeve 63 may be pushed downwardly upon the return stroke of the rod 61 so as to insure return of the fingers 44 to their initial, clay-receiving positions rather than depend entirely upon gravity for that return.

The rod 61 is traveling throughout the travel of the molds over the table 12 and the front table end 14, this rod being given an upward travel for each shift of these molds. Since it is desired to unload the fingers 44 (forming in effect a basket) immediately one mold travels under the wire 33 and before the next mold is shifted thereunder, the stop 64 is set down on the rod 61 so that a portion of the travel of the rod 61 is utilized and this travel so utilized is near the end of the shifting of the molds, that is when the mold is first introduced by its forward edge under the wire 33. In this brief interval of movement, by reason of the difference in size of the gears 53 and 55 and the lever length 56, the fingers 44 are flipped around to dump and then returned back against the plate 48 in a very short interval of time so as to be ready to receive the sheared-off clay immediately the molds are again shifted. The molds, of course, are standing still when they are being filled with clay by the machine and only shift automatically and intermittently following the filling of each mold.

The belt 65 is carried around the end pulleys 66 and 67, Fig. 2. The pulley 66 is mounted on the forward end of a drive shaft 68 that is carried through suitable bearings 69 and 70 mounted on the arms 31 to have a bevel gear 71 fixed on its rear end and in constant mesh with a bevel gear 72 fixed on the transverse shaft 73 that is carried in suitable bearings mounted on the arms 31 and 32. On the outer end of the shaft 73 is a drive pulley 74 about which the drive belt 75 passed rearwardly and upwardly to a shaft 76 on the molding machine, this shaft 76 being only employed in driving the molding apparatus. The belt 65 is thus driven to carry the clay deposit thereon to one side and drop it thereoff.

Thus it is to be seen that to the heretofore employed molding machine structure, we have added thereto a very simple and unique means for stripping the clay protruding above the molds and removing the stripped clay following the cutting off by the cutting wire, all with the minimum number of parts and motions. While the invention has been herein shown and described in the one particular form, it is obvious that structural variations may be employed without departing from the spirit of the invention and it is not intended that the invention be limited to that specific form beyond the limitations as may be imposed by the following claims.

We claim:

1. In a brick molding machine, a table, molds movable over said table, means for intermittently moving said molds over the table, the forward end of the table being arranged to be vertically shiftable, means for lowering said forward table end when said molds are being moved thereover and for lifting the table at the end of the mold travel, stationary clay cutting means extending across said shiftable end of the table and spaced thereabove and positioned to have said molds lift and stop thereagainst upon said lifting of the table end, means receiving clay cut from above said molds by said cutting means, and means intermittently driven in sequence with said molds for shifting said receiving means to dump the clay therefrom.

2. In a brick molding machine, a table, molds movable over said table, means for intermittently moving said molds over the table, the forward end of the table being arranged to be vertically shiftable, means for lowering said forward table end when said molds are being moved thereover and for lifting the table at the end of the mold travel, clay cutting means extending across the table and spaced thereabove and positioned to have said molds stop thereagainst upon said lifting of the table end, means receiving clay cut from above said molds by said cutting means, and means intermittently driven in sequence with said molds for shifting said receiving means to dump the clay therefrom, said clay cutting means consisting of a tightly stretched wire, and said clay receiving means comprising a rockable shaft and members extending therefrom rearwardly toward said wire.

3. In a brick molding machine, a table, molds movable over said table, means for intermittently moving said molds over the table, the forward end of the table being arranged to be vertically shiftable, means for lowering said forward table end when said molds are being moved thereover and for lifting the table at the end of the mold travel, clay cutting means extending across the table and spaced thereabove and positioned to have said molds stop thereagainst upon said lifting of the table end, means receiving clay cut from above said molds by said cutting means, and means intermittently driven in sequence with said molds for shifting said receiving means to dump the clay therefrom, said table end being hinged to the table at its rear end, said table end lowering and lifting means comprising a toggle assembly normally urged to a straight line vertical position by a spring.

4. In a brick molding machine, a table, molds, means intermittently shifting the molds over the table, mold bumpers at the sides of the table, and means under the table for actuating the bumpers as each mold is shifted and stopped therebetween, a table forward end vertically shiftable, table end lowering means, a drive connection between said bumper actuating means and the table end lowering means, means lifting the table end independently of said drive connection, clay cutting means mounted to extend across said table end and rest against the top of a mold supported by the table end in lifted position to shear off clay protruding above the mold traveling thereunder, and means receiving the sheared off clay.

5. In a brick molding machine a table, molds, means intermittently shifting the molds over the table, mold bumpers at the sides of the table, and means under the table for actuating the bumpers as each mold is shifted and stopped therebetween, a table forward end vertically shiftable, table end lowering means, a drive connection between said bumper actuating means and the table end lowering means, means lifting the table end independently of said drive connection, clay cutting means mounted to extend across said table end and rest against the top of a mold supported by the table end in lifted position to shear off clay protruding above the mold traveling thereunder, and means receiving the sheared off clay, said table end lifting means consisting of a spring, and said drive connection working in opposition to the spring.

6. In a brick molding machine, a table, molds, means intermittently shifting the molds over the table, mold bumpers at the sides of the table, and means under the table for actuating the bumpers as each mold is shifted and stopped therebetween, a table forward end vertically shiftable, table end lowering means, a drive connection between said bumper actuating means and the table end lowering means, means lifting the table end independently of said drive connection, clay cutting means mounted to extend across said table end and rest against the top of a mold supported by the table end in lifted position to shear off clay protruding above the mold traveling thereunder, and means receiving the sheared off clay, said receiving means comprising a rockable basket, and means driven intermittently by said machine to dump said basket substantially at the end of each mold travel on the table.

7. In a brick molding machine, a table, molds movable over said table, means for intermittently moving said molds over the table, the forward end of the table being arranged to be vertically shiftable, means for lowering said forward table end when said molds are being moved thereover and for lifting the table at the end of the mold travel, clay cutting means extending across the table and spaced thereabove and positioned to have said molds stop thereagainst upon said lifting of the table end, means receiving clay cut from above said molds by said cutting means, and means intermittently driven in sequence with said molds for shifting said receiving means to dump the clay therefrom, said clay cutting means consisting of a tightly stretched wire, and said clay receiving means comprising a rockable shaft and members extending therefrom rearwardly toward said wire, said clay receiving means members comprising spaced apart rods.

8. In a brick molding machine, a table, molds movable over said table, means for intermittently moving said molds over the table, the forward end of the table being arranged to be vertically shiftable, means for lowering said forward table end when said molds are being moved thereover and for lifting the table at the end of the mold travel, clay cutting means extending across the table and spaced thereabove and positioned to have said molds stop thereagainst upon said lifting of the table end, means receiving clay cut from above said molds by said cutting means, and means intermittently driven in sequence with said molds for shifting said receiving means to dump the clay therefrom, said clay cutting means consisting of a tightly stretched wire, and said clay receiving means comprising a rockable shaft and members extending therefrom rearwardly toward said wire, said clay receiving means members comprising spaced apart rods each downwardly curved and reducing in cross-sectional area toward its rear end.

9. In a brick molding machine, a table, molds, means intermittently shifting the molds over the table, mold bumpers at the sides of the table, and means under the table for actuating the bumpers as each mold is shifted and stopped therebetween, a table forward end vertically shiftable, table end lowering means, a drive connection between said bumper actuating means and the table end lowering means, means lifting the table end independently of said drive connection, clay cutting means mounted to extend across said table end and rest against the top of a mold supported by the table end in lifted position to shear off clay protruding above the mold traveling thereunder, and means receiving the sheared off clay, said receiving means comprising a rockable basket, and means driven intermittently by said machine to dump said basket substantially at the end of each mold travel on the table, and a conveyor belt extending transversely across and above the level of said table, over which belt said basket is turned to dump thereon.

10. In a brick molding machine, a table, molds, means for moving the molds across the table, clay cutting means extending across the table and spaced in fixed position thereabove for trimming surplus clay from the molds, and table lowering and raising means intermittently increasing and decreasing the spacing relatively between the table and the cutting means in accordance with travel of the molds.

11. In a brick molding machine, a table, molds, means for moving the molds across the table, clay cutting means extending across the table and spaced in fixed position thereabove for trimming surplus clay from the molds, and table lowering and raising means intermittently increasing and decreasing the spacing relatively between the table and the cutting means in accordance with travel of the molds, and means receiving said clay as trimmed and removing it.

FREDERICK M. ANTIBUS, Jr.
HARRY D. CAYLOR.